(12) United States Patent
Child (10) Patent No.: US 8,854,392 B2
(45) Date of Patent: Oct. 7, 2014

(54) CIRCULAR SCRATCH SHADER

(75) Inventor: Philip Child, San Francisco, CA (US)

(73) Assignee: Pixar, Emeryville, CA (US)

( * ) Notice: Subject to any disclaimer, the term of this patent is extended or adjusted under 35 U.S.C. 154(b) by 365 days.

(21) Appl. No.: 13/312,905

(22) Filed: Dec. 6, 2011

(65) Prior Publication Data
US 2013/0141451 A1 Jun. 6, 2013

(51) Int. Cl.
*G09G 5/00* (2006.01)
(52) U.S. Cl.
USPC ............................ 345/582; 345/426; 345/584
(58) Field of Classification Search
CPC ................................. G09G 5/006; G09G 5/00
USPC .................... 345/582, 426, 584, 611
See application file for complete search history.

(56) References Cited

U.S. PATENT DOCUMENTS

| | | | |
|---|---|---|---|
| 5,777,620 A * | 7/1998 | Billyard | 345/426 |
| 2007/0139408 A1* | 6/2007 | Keranen | 345/426 |

OTHER PUBLICATIONS

"New and Used Cars", Child, Ling, Seiden, Aug. 7-11, 2011, http://modsim.gist.ac.kr/thesis/SIGGRAPH2011/disk1/content/studio-talks/child.pdf.*

* cited by examiner

*Primary Examiner* — David Zarka
*Assistant Examiner* — Sohum Kaji
(74) *Attorney, Agent, or Firm* — Patterson & Sheridan, LLP (57) ABSTRACT

A computer-implemented method for generating a circular scratch highlight. The method includes generating a plurality of texture planes, where each texture plane includes a plurality of copies of a scratch texture oriented in the same direction; generating a combined texture by combining the plurality of texture planes at different angles; applying the combined texture to a surface of an object; calculating a specular gradient vector based on a light vector and a reflectance vector, wherein the specular gradient vector points in a gradient direction of a specular highlight; and generating the circular scratch highlight by assigning, for each of a plurality of points on the surface of the object, a separate weight value corresponding to each texture plane in the combined texture based on how closely an orientation of the texture plane at the point corresponds to a scratch vector that is perpendicular to the specular gradient vector.

18 Claims, 13 Drawing Sheets

CIRCULAR SCRATCH SHADER

BACKGROUND

1. Field of the Invention

The present invention relates to the field of computer graphics and, in particular, to a circular scratch shader.

2. Description of the Related Art

Shiny surfaces covered by fine multi-directional scratches can give the appearance of concentric circles aligned around an isotropic specular highlight. An example of such a surface is the metallic paint surface of a car. Rending this effect has proven to be quite challenging.

One prior attempt to render this effect involves using extremely high-resolution multi-directional textures. However, this technique is computationally expensive, especially for large surfaces or intricate scenes. Another prior approach involves modulating a noise texture by circular patterns. This approach, however, does not provide realistic or pleasing results.

As the foregoing illustrates, there is a need in the art for an improved technique that addresses the limitations of current approaches set forth above.

SUMMARY

Embodiments of the invention define a technique to generate circular scratches. The technique involves defining an overlapping set of textures featuring straight scratches. Of these textures, a weighted subset is evaluated. In one embodiment, contribution from each texture is weighted based on a relative alignment of the texture to a gradient of the specular highlight. Embodiments of the invention compute two vectors. The first vector is a specular gradient-aligned vector, derived from a reflection vector of light from the surface. The second vector is the orientation of the textures' alignment. The angle between the two vectors dictates the weighting of an individual texture's contribution. In some embodiments, the first vector can be used in conjunction with a surface tangent to define a polar coordinate space around the center of the specular highlight. The polar coordinate space can be used apply a pattern to the circular scratch highlight to add streaks or flares, which provides even more pleasing results.

One embodiment of the invention provides a computer-implemented method for generating a circular scratch highlight. The method includes accessing a plurality of texture planes, wherein each texture plane includes a plurality of copies of a texture oriented in the same direction; accessing a combined texture by combining the plurality of texture planes at different angles; applying the combined texture to a surface of an object; calculating a specular gradient vector based on a light vector, a normal vector, and a view vector, wherein the specular gradient vector points in a gradient direction of a specular highlight; and generating the circular scratch highlight by assigning, for each of a plurality of points on the surface of the object, a separate weight value corresponding to each texture plane in the combined texture based on how closely an orientation of the texture plane at the point corresponds to a scratch vector that is perpendicular to the specular gradient vector.

Another embodiment of the invention provides a computer-implemented method for rendering. The method includes calculating a specular gradient vector based on a light vector, a normal vector, and a view vector, wherein the specular gradient vector points in a gradient direction of a specular highlight; and rendering a point on a surface of the object based on the specular gradient vector.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

One embodiment of the invention provides a computer-implemented method for generating a circular scratch highlight. The method includes accessing a plurality of texture planes, wherein each texture plane includes a plurality of copies of a texture oriented in the same direction; accessing a combined texture by combining the plurality of texture planes at different angles; applying the combined texture to a surface of an object; calculating a specular gradient vector based on a light vector, a normal vector, and a view vector, wherein the specular gradient vector points in a gradient direction of a specular highlight; and generating the circular scratch highlight by assigning, for each of a plurality of points on the surface of the object, a separate weight value corresponding to each texture plane in the combined texture based on how closely an orientation of the texture plane at the point corresponds to a scratch vector that is perpendicular to the specular gradient vector.

Another embodiment of the invention provides a computer-implemented method for rendering. The method includes calculating a specular gradient vector based on a light vector, a normal vector, and a view vector, wherein the specular gradient vector points in a gradient direction of a specular highlight; and rendering a point on a surface of the object based on the specular gradient vector.

One embodiment of the invention provides a computer-implemented method for generating a circular scratch highlight. The method includes generating a plurality of texture planes, where each texture plane includes a plurality of copies of a scratch texture oriented in the same direction; generating a combined texture by combining the plurality of texture planes at different angles; applying the combined texture to a surface of an object; calculating a specular gradient vector based on a light vector and a reflectance vector, wherein the specular gradient vector points in a gradient direction of a specular highlight; and generating the circular scratch highlight by assigning, for each of a plurality of points on the surface of the object, a separate weight value corresponding to each texture plane in the combined texture based on how closely an orientation of the texture plane at the point corresponds to a scratch vector that is perpendicular to the specular gradient vector.

Generating Circular Scratch Highlights

Figure 1:
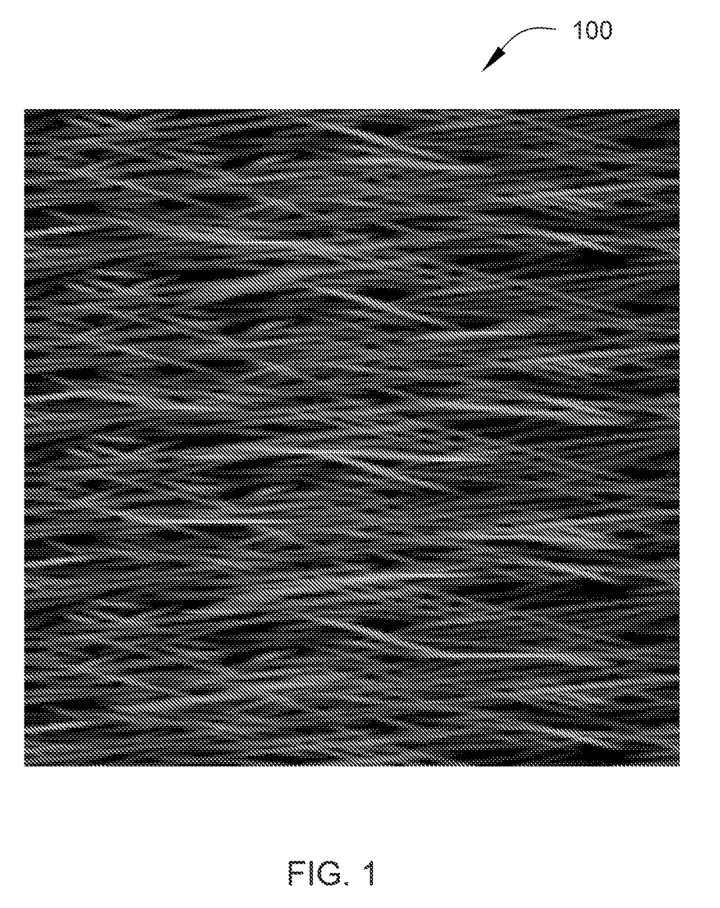
FIG. 1 is a conceptual diagram of a texture that includes a plurality of scratch elements, according to one embodiment.

FIG. 1 is a conceptual diagram of a texture 100 that includes a plurality of scratch elements, according to one embodiment. As shown, the texture 100 may have a rectangular or square shape. In one embodiment, each scratch element included in the texture 100 has the same width. In other embodiments, the scratch elements have a range of widths. The scratch elements are arranged so that the direction of each scratch element is generally the same. As shown in the example in FIG. 1, the scratch elements are generally arranged in a left-to-right direction. As also shown, the scratch elements are not perfectly aligned along an axis, e.g., the scratch elements in texture 100 are not perfectly aligned along a left-right axis. The slight deviation of the direction of the scratch elements produces, in some embodiments, more pleasing results when the texture 100 is used to generate s circular scratch highlight.

The texture 100 can be created in a variety of techniques. For example, the texture 100 can be procedurally generated, may be hand-drawn, or may be based on a photograph. In some embodiments, the scratch elements in the texture 100 are arranged in a manner that allows multiple copies of the texture 100 to be mapped to a surface without noticeable boundaries between individual textures.

Figure 2A:
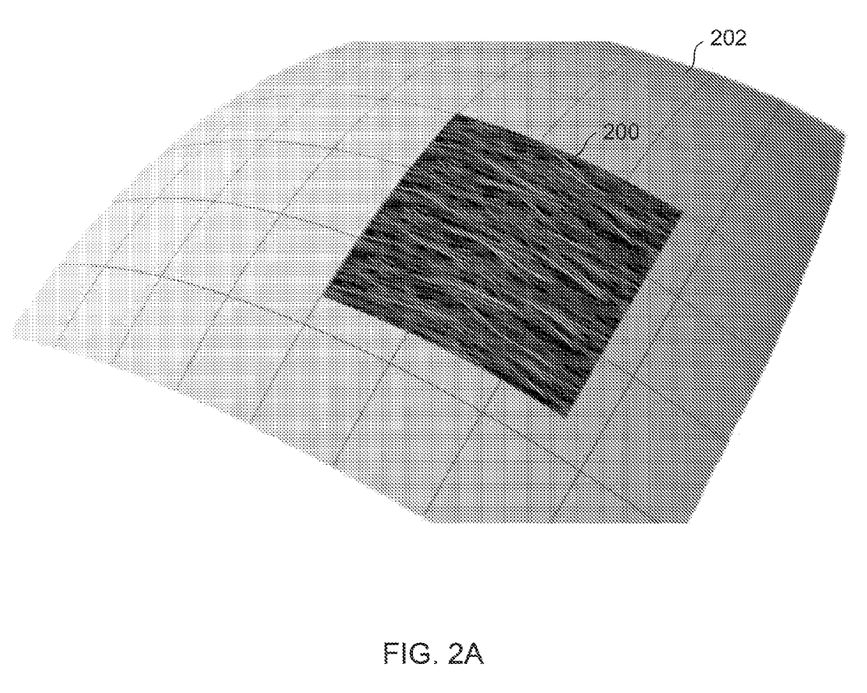
FIG. 2A is a conceptual diagram illustrating texture mapped to a curved surface, according to one embodiment.

FIG. 2A is a conceptual diagram illustrating texture 200 mapped to a curved surface 202, according to one embodiment. The surface 202 may be arranged as a grid onto which multiple copies of the texture 200 are mapped.

Figure 2B:
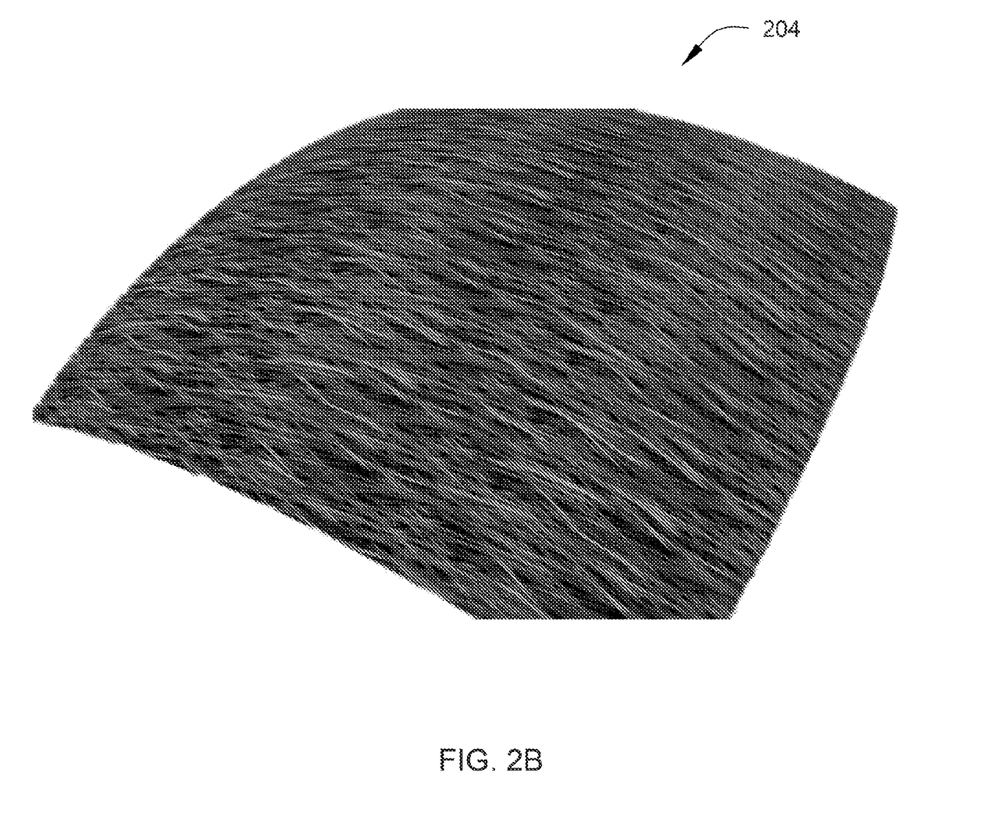
FIG. 2B is a conceptual diagram illustrating multiple copies of a texture mapped to a curved surface, according to one embodiment.

FIG. 2B is a conceptual diagram illustrating multiple copies of a texture mapped to a curved surface 204, according to one embodiment. The entire surface 204 can be covered with copies of the texture such that the boundaries between individual copies of the texture are not noticeable. In one embodiment, a "texture plane" is defined by a plurality of copies of the same texture mapped in a plane. Each of the individual copy of the texture in the texture plane is oriented in the same direction and is not rotated with respect to the other copies of the texture. For example, each of the textures is oriented such that the scratch elements are aligned left-to-right. Again, the scratch elements are not necessary perfectly aligned left-to-right, but generally left-to-right with a range of deviation from a left-to-right axis line. As described in greater detail herein, embodiments of the invention may generate a plurality of texture planes, each oriented at a slightly different angle.

Figure 3:
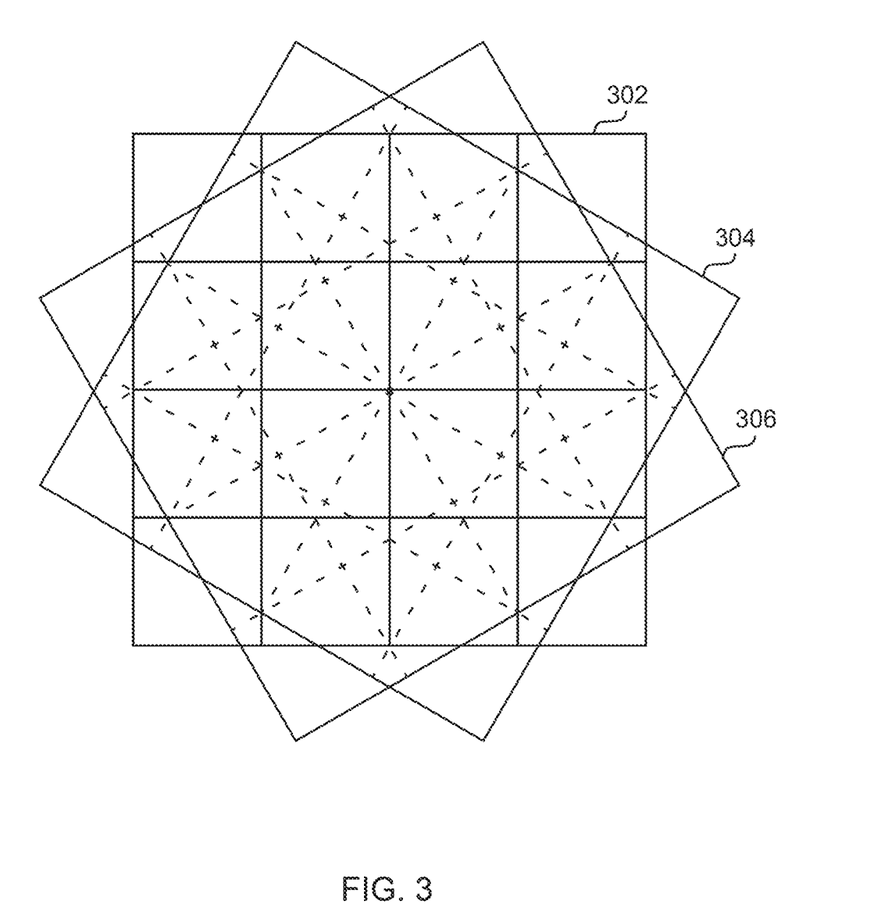
FIG. 3 is a conceptual diagram illustrating a plurality of texture planes, according to one embodiment.

FIG. 3 is a conceptual diagram illustrating a plurality of texture planes 302, 304, 306, according to one embodiment. As shown, texture plane 302 includes a four-by-four grid of textures. As described, each of the textures in texture plane 302 is oriented in the same direction. Also shown in FIG. 3 are texture planes 304 and 306. Similar to texture plane 302, each of the textures within texture planes 304, 306 is also oriented in the same direction relative to the other textures within the same texture plane. The texture planes 302, 304, 306 are then oriented to have a common center and are rotated with respect to one another. Only three texture planes 302, 304, 306 are shown in FIG. 3, but any number of texture planes may be used. Each texture plane may be oriented with a different angle relative to the other texture planes. In some embodiments, the number of texture planes may be user-configurable. For example, the number of texture planes may be approximately 30-50 texture planes.

When a plurality of texture planes (made up of textures that include scratch elements) are rotated and overlaid on top of one another, as shown in FIG. 3, the result is a "combined texture" with scratches oriented in as many directions as there are texture planes in the combined texture. Once a certain number of texture planes are overlaid on top of one another (e.g., approximately 30-40 texture planes), the scratches appear to be randomly spaced throughout the combined texture and appear to be oriented in random directions. The combined texture that includes a plurality of texture planes can then be applied to the surface of a three-dimensional (3D) or two-dimensional (2D) object.

Figure 4:
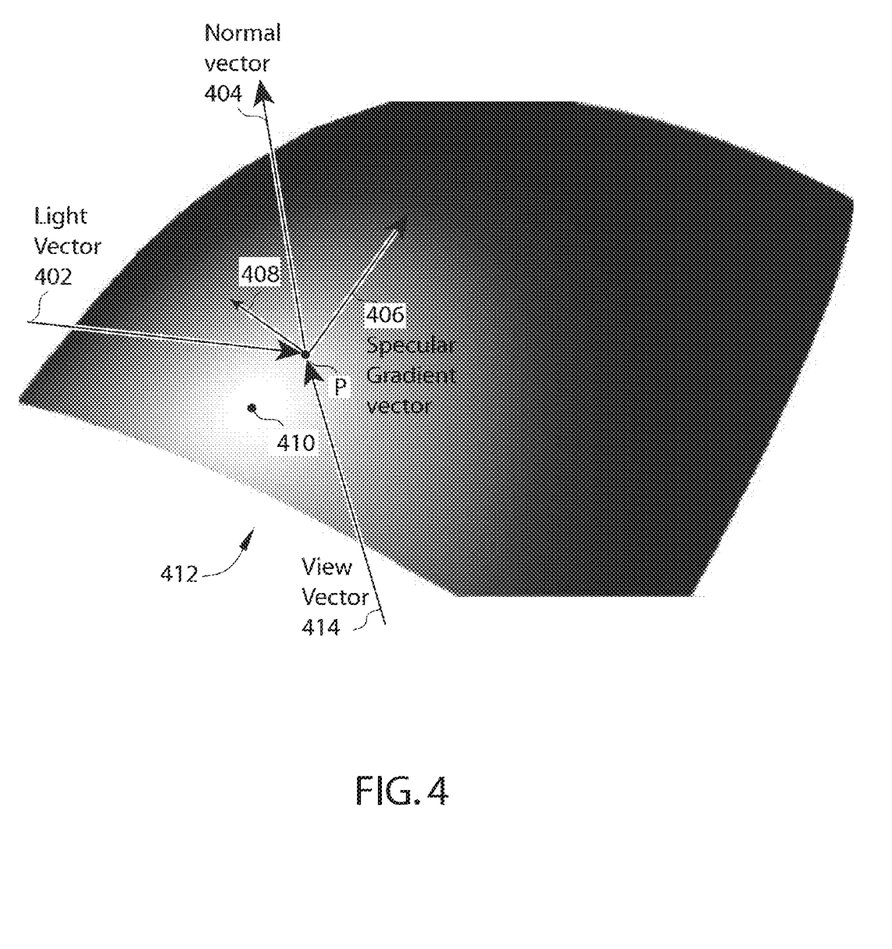
FIG. 4 is a conceptual diagram illustrating a specular highlight and a specular gradient vector, according to one embodiment.

FIG. 4 is a conceptual diagram illustrating a specular highlight 412 and a specular gradient vector 406, according to one embodiment. A specular highlight 412 is shown on the surface of the object. As is known, a specular highlight 412 is a bright spot of light that appears on shiny objects when illuminated. The specular highlight 412 has a center 410. A light vector 402 strikes the surface of the object at point P. As shown in the example in FIG. 4, the specular highlight 412 is white at the center 410 and has a gradient that fades to black as the distance from the center 410 increases.

Embodiments of the invention provide a technique to render a specular highlight that includes circular scratches, also referred to herein as a "circular scratch highlight." A rendering application can evaluate the surface of the object at a plurality of points to generate the circular scratch highlight. One example at point P is shown in FIG. 4. Again, the light vector 402 strikes the object at point P. A normal vector 404 extends away from point P in a direction perpendicular to the surface at point P. A view vector 414 represents the vector from a viewer or camera to the point P. A specular gradient vector 406 at point P can be calculated based on the normal vector 404, the view vector 414, and the light vector 402. The specular gradient vector 406 points in the direction of the gradient of the specular highlight 412. Also shown in FIG. 4 is a scratch vector 408 that is perpendicular to the specular gradient vector 406 and corresponds to the direction of scratches at given location based on the specular gradient vector 406.

In one embodiment, when using a Phong specular model, the specular gradient vector 406 can be calculated using the following equation:

$$\text{SpecularGradientVector\_Phong} = N^{(2(N \cdot V)N - V)^L}$$

where N represents the normal vector 404, V represents the view vector 414, and L represents the light vector 402.

In another embodiment, when using a Blinn specular model, the specular gradient vector 406 can be calculated using the following equation:

$$\text{SpecularGradientVector\_Blinn} = N\left(\frac{L+V}{|L+V|}\right)^L$$

where N represents the normal vector 404, V represents the view vector 414, and L represents the light vector 402.

To generate circular scratches in the specular highlight 412, embodiments of the invention sample the textures from the combined texture map that are aligned with the scratch vector 408. In other words, of the plurality of texture maps at particular point, the contribution of a particular texture is dependent on how closely the orientation of the texture matches the orientation of the scratch vector 408. For example, a texture that has an orientation that closely matches the orientation of the scratch vector 408 is assigned a higher weight than a texture that has an orientation that is perpendicular to the orientation of the scratch vector 408. In some embodiments, some of the textures are given a weight of zero.

Figure 5:
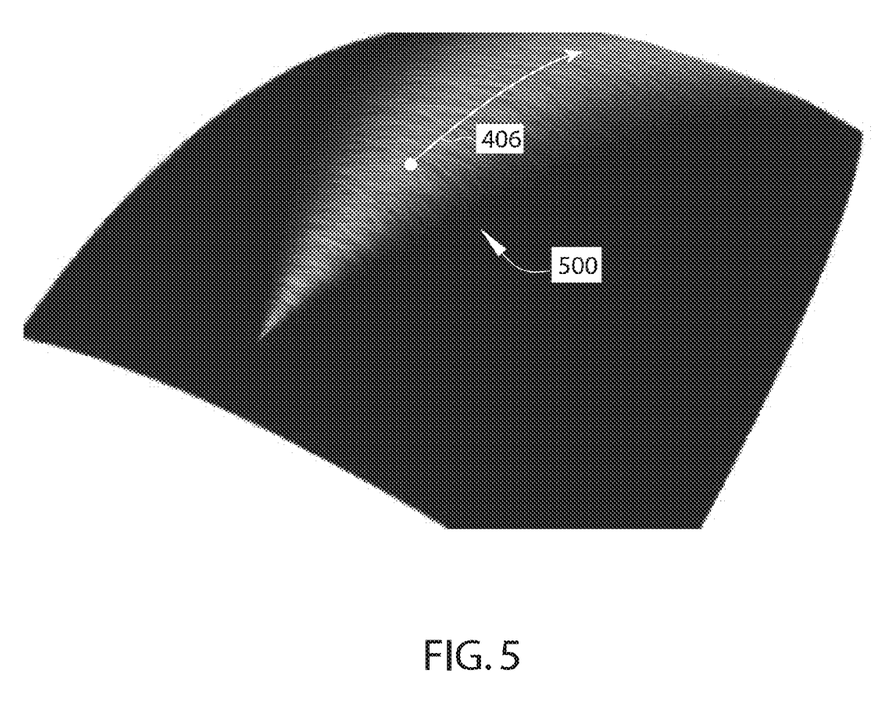
FIG. 5 is a conceptual diagram illustrating a cone of scratches associated with a particular specular gradient vector, according to one embodiment.

FIG. 5 is a conceptual diagram illustrating a cone of scratches associated with a particular specular gradient vector 406, according to one embodiment. In one embodiment, the specular gradient vector 406 calculated in FIG. 4 is normalized by being projected to the surface of the object, as shown in FIG. 5. As shown, the scratches within cone 500 are oriented to be perpendicular to the specular gradient vector 406 along the surface of the object. In some embodiments, the intensity of the specular highlight decreases as a function of the angle between the specular gradient vector 406 and the scratch vector 408. As shown, the scratches appear to fade away towards the outer edges of the cone 500.

Figure 6:
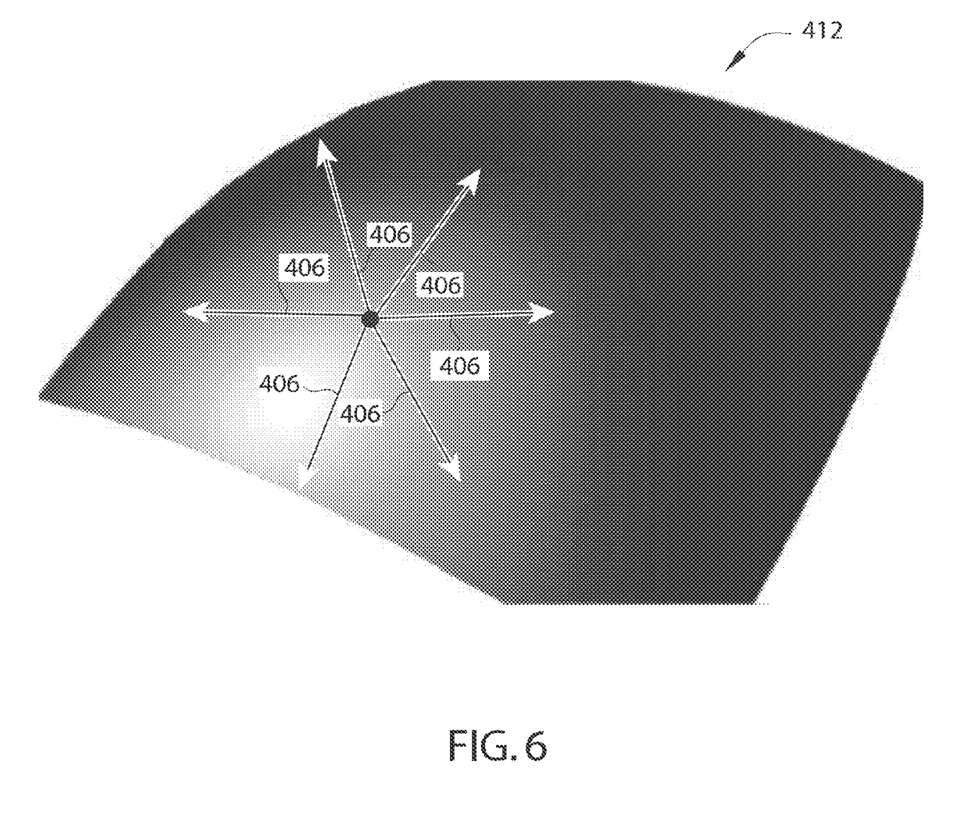
FIG. 6 is a conceptual diagram illustrating a plurality of specular gradient vectors, according to one embodiment.

As shown, the cone 500 represents a "slice" of the circular scratch highlight. To generate the remaining portions of the circular scratch highlight, the same technique is repeated to generate another cone having a different specular gradient vector as the "center-line" of the cone. FIG. 6 is a conceptual diagram illustrating a plurality of specular gradient vectors 406, according to one embodiment. For each specular gradient vector 406 in FIG. 6, a separate "cone" of scratches (as shown in FIG. 5) can be generated. The plurality of cones can then be blended together to achieve the desired result of a complete circular scratch highlight.

Figure 7:
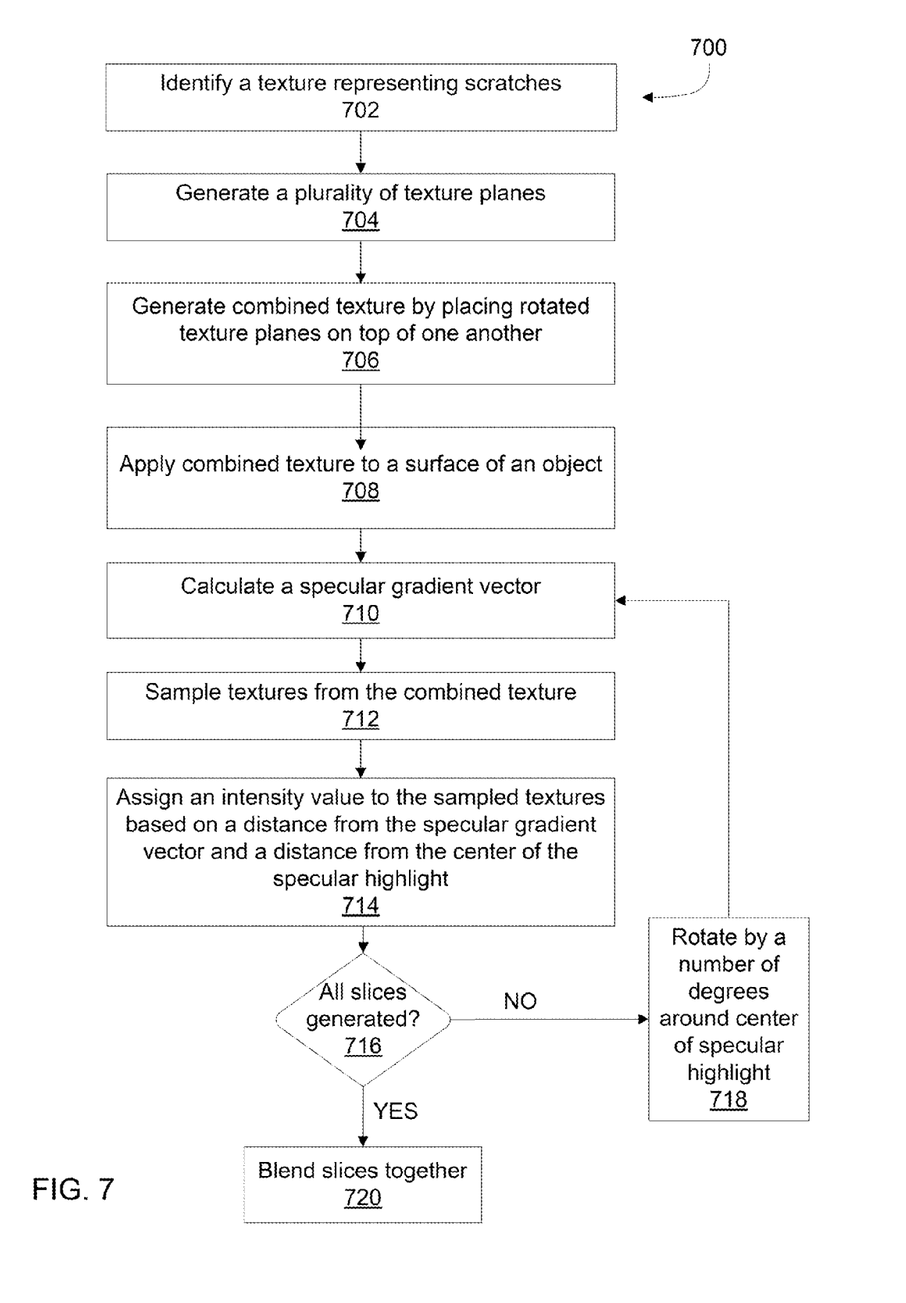
FIG. 7 is a flow diagram of method steps for generating a circular scratch highlight, according to one embodiment.

FIG. 7 is a flow diagram of method steps for generating a circular scratch highlight, according to one embodiment. Persons skilled in the art will understand that, even though the method 700 is described in conjunction with the systems of FIGS. 1-6 and 12, any system configured to perform the method steps, in any order, is within the scope of embodiments of the invention.

As shown, the method 700 begins at step 702, where a software application, such as a rendering application executed by a processor, identifies a texture representing scratches. In one embodiment, the software application may be a shader program. The texture may have been generated procedurally, hand-drawn, obtained from a photograph, or generated via any other technique. Scratch elements included in the texture may each have the same width or a range of widths. The scratch elements are generally oriented in the same direction. However, it is not necessary for all the scratches to be perfectly aligned with one another along a common line.

At step 704, the software application generates a plurality of texture planes using copies of the texture. As described above, multiple copies of the texture can be arranged in a texture plane, where each copy of the texture within the texture plane is oriented in the same direction relative to the other copies of the texture.

At step 706, the software application generates a combined texture by placing rotated texture planes on top of one another. In one example, approximately forty texture planes are placed on top of one another at various angles to generate the combined texture. In some embodiments, steps 702, 704, 706 are "pre-computed" and the software application can access the texture, the texture planes, and/or the combined texture from a library.

At step 708, the software application applies the combined texture to a surface of an object. At step 710, the software application calculates a specular gradient vector based on the light vector, the view vector, and the normal vector at a point particular point. As described above, the specular gradient vector extends outward from the specular highlight in the direction of the gradient of the specular highlight. According to various embodiments, the specular gradient vector can be calculated based on a Phong specular model, a Blinn specular model, or any other specular model.

At step 712, the software application samples textures from the combined texture. In one embodiment, each texture within the combined texture is assigned a weight that corresponds to how closely the orientation of a texture aligns with a scratch vector that is perpendicular to the specular gradient vector. In some embodiments, some textures are assigned a weight of zero.

At step 714, the software application assigns an intensity value to the sampled textures based on, for each point, an angle between the specular gradient vector and a scratch vector at the point. In some embodiments, the intensity value is further based on a distance of the point from the center of the specular highlight. The result following the completion of step 714 is a "slice" of the circular scratch highlight, as shown in FIG. 5. At each point in the cone, the scratch elements are aligned with the scratch vector that is perpendicular to the specular gradient vector.

At step 716, the software application determines whether the all of the slices of the circular scratch highlight have been generated. If the software application determines that not all of the slices of the circular scratch highlight have been generated, then the method 700 proceeds to step 718, where the software application rotates the specular gradient vector by a predetermined number of degrees around the normal vector 404. The method then returns to step 710, as described above. After each loop through steps 718, 710, 712, and 714, the software application generates another "slice" of the circular scratch highlight.

Figure 8:
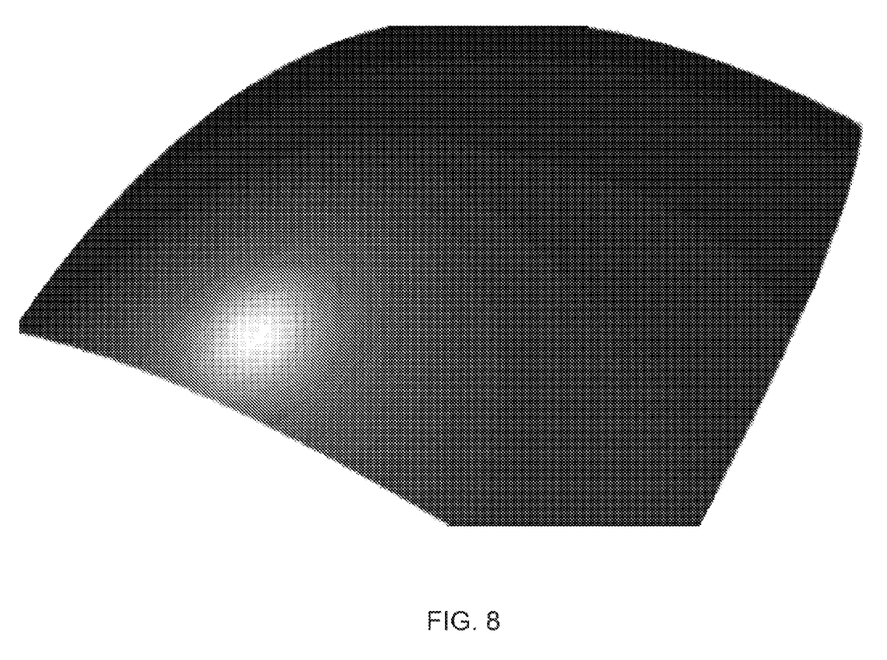
FIG. 8 is an example of a circular scratch highlight generated using the technique of FIG. 7, according to one embodiment.

At step 716, if the software application determines that all of the slices of the circular scratch highlight have been generated, then the method proceeds to step 720, where the software application blends adjacent slices of the circular scratch highlight together. The result is the complete circular scratch highlight. FIG. 8 is an example of a circular scratch highlight generated using the technique of FIG. 7, according to one embodiment. As shown, the scratch elements appear to be in co-centric circles around the center of the specular highlight.

Although FIG. 7 is described in terms of a "software application" configured to perform the various steps, in another embodiment, the method 700 can also be implemented in fixed-function hardware configured to perform the method steps. In yet another embodiment, the method steps in FIG. 7 can be implemented in a combination of software and hardware.

Figure 9:
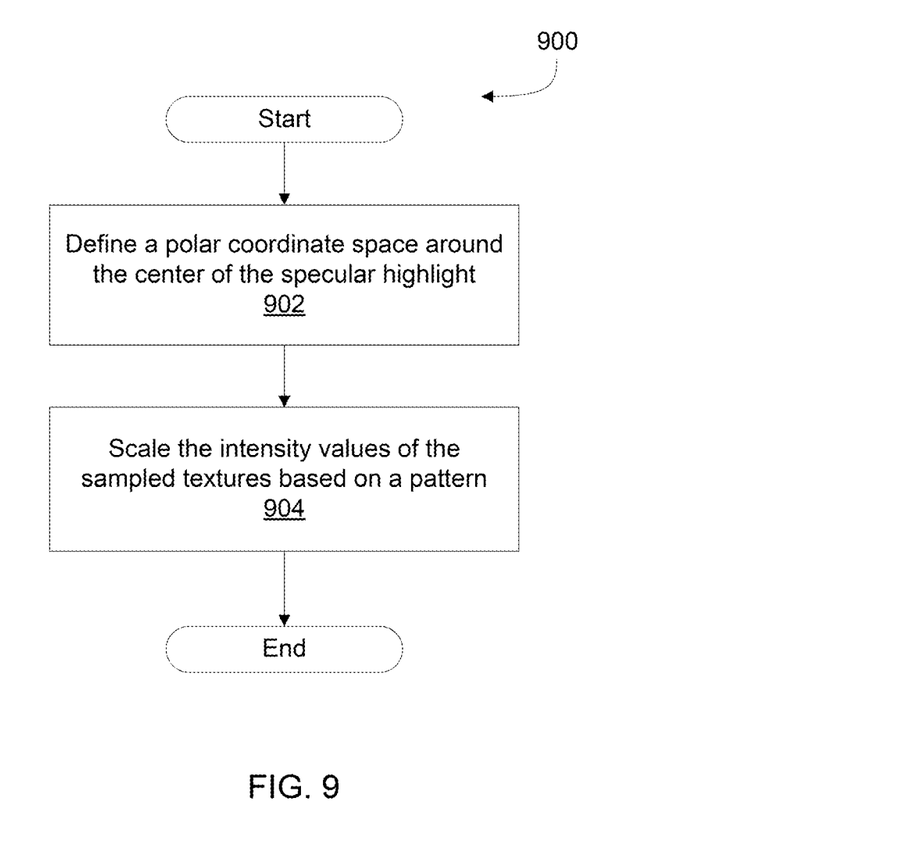
FIG. 9 is a flow diagram of method steps for adding streaks to a circular scratch highlight, according to one embodiment.

In some embodiments, "streaks" can be added to the circular scratch highlight to give even more pleasing results. FIG. 9 is a flow diagram of method steps for adding streaks to a circular scratch highlight, according to one embodiment. Persons skilled in the art will understand that, even though the method 900 is described in conjunction with the systems of FIGS. 1-6 and 10-12, any system configured to perform the method steps, in any order, is within the scope of embodiments of the invention.

As shown, the method 900 begins at step 902, where a software application, such as a rendering application executed by a processor, defines a polar coordinate space around the center of the specular highlight. In one embodiment, the polar coordinate space is defined by computing the angle between the specular gradient vector and an arbitrary surface tangent. The polar coordinate space provides a specular highlight-relative coordinate system that can be used to add streaks or flare patterns to the circular scratch highlight.

Figure 10:
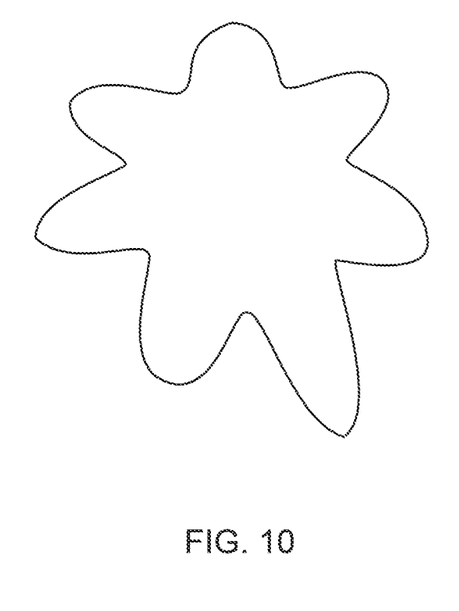
FIG. 10 is a conceptual diagram illustrating a pattern that can be applied to the specular circular scratch highlight to produce the effect of streaks or flares, according to one embodiment.

At step 904, the software application scales the intensity values of the sampled textures based on a field. The sampled textures may be those sampled at step 712 and assigned intensity values in step 714, described above. Scaling the intensity values comprises increasing or decreasing the intensity values based on a relationship between the sampled textures and the field. FIG. 10 is a conceptual diagram illustrating a field that can be applied to the specular circular scratch highlight to produce the effect of streaks or flares, according to one embodiment. The field shown in FIG. 10 has a star shape, but any field of any shape can be used. In some embodiments, the field is random and the intensity values are scaled randomly to generate the flares/streaks.

Figure 11:
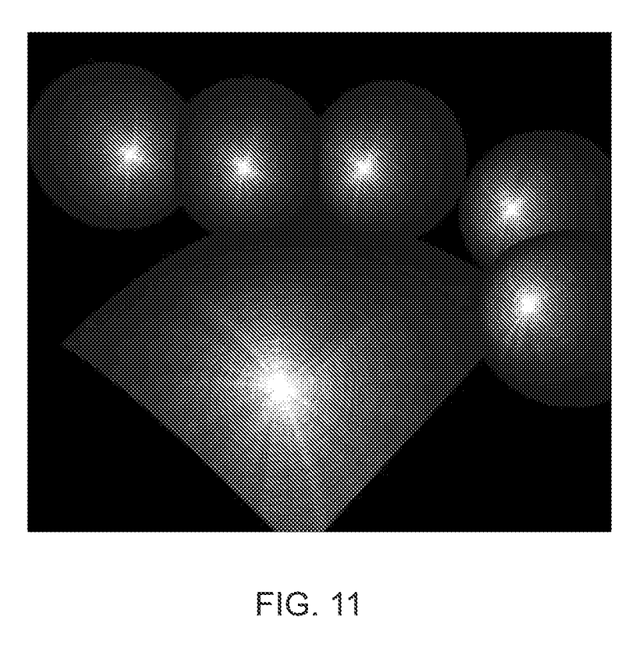
FIG. 11 is a conceptual diagram illustrating streaks or flares added to a circular scratch highlight, according to one embodiment.

FIG. 11 is a conceptual diagram illustrating streaks or flares added to a circular scratch highlight, according to one embodiment. As shown, the intensity of the circular scratches increases or decreases at certain angles around the center of the specular highlight, which produces the flare effect.

In sum, embodiments of the invention define a technique to generate circular scratches. The technique involves defining an overlapping set of textures featuring straight scratches. Of these textures, a weighted subset is evaluated. In one embodiment, contribution from each texture is weighted based on a relative alignment of the texture to a gradient of the specular highlight. Embodiments of the invention compute two vectors. The first vector is a specular gradient-aligned vector, derived from a reflection vector of light from the surface. The second vector is the orientation of the textures' alignment. The angle between the two vectors dictates the weighting of an individual texture's contribution. In some embodiments, the first vector can be used in conjunction with a surface tangent to define a polar coordinate space around the center of the specular highlight. The polar coordinate space can be used apply a field to the circular scratch highlight to add streaks or flares, which provides even more pleasing results.

Hardware Overview

Figure 12:
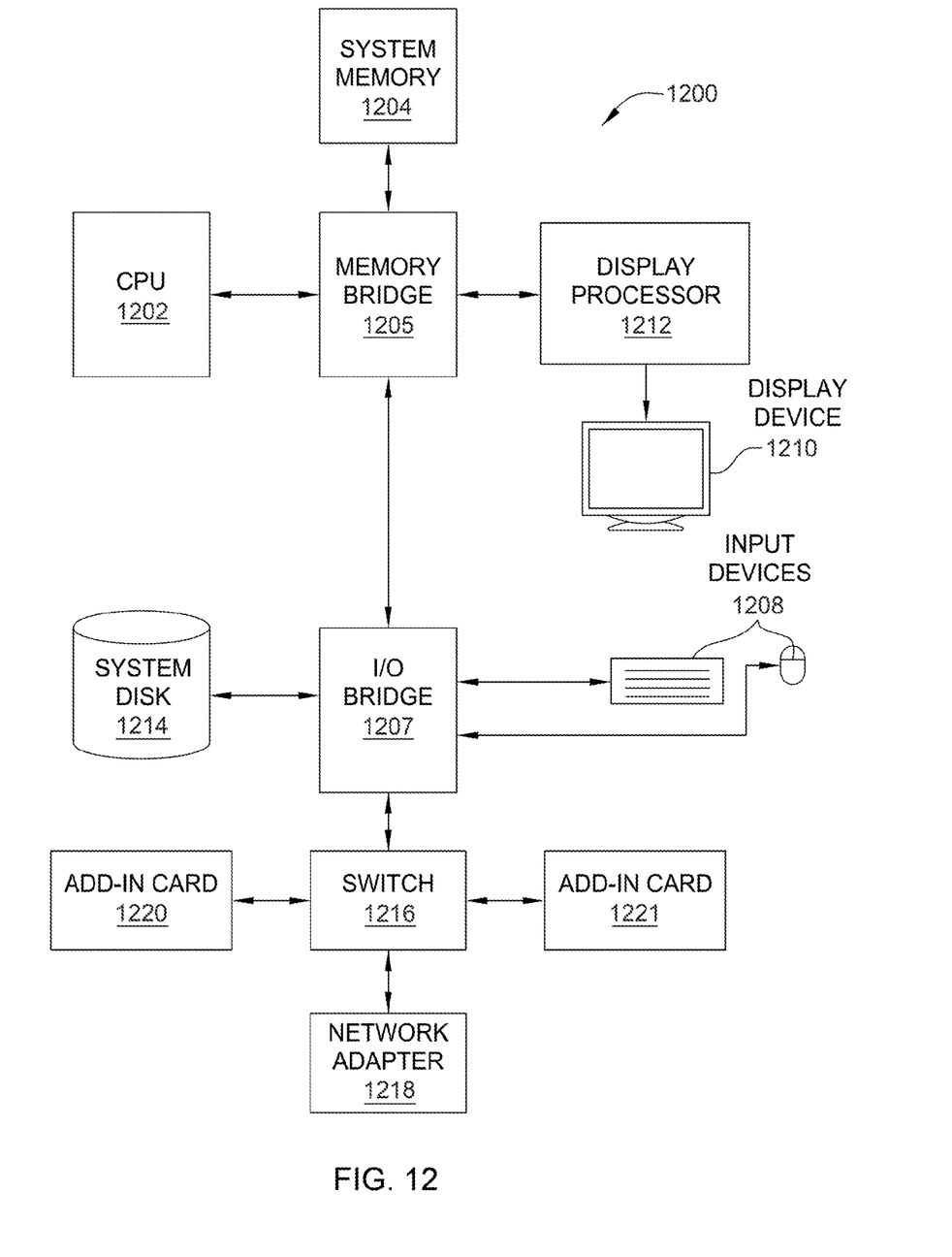
FIG. 12 is a block diagram of a system configured to implement one or more aspects of the invention.

FIG. 12 is a block diagram of a system 1200 configured to implement one or more aspects of the invention. This figure in no way limits or is intended to limit the scope of embodiments described herein.

System 1200 may be a personal computer, video game console, personal digital assistant, rendering engine, or any other device suitable for practicing one or more embodiments of the present invention.

As shown, system 1200 includes a central processing unit (CPU) 1202 and a system memory 1204 communicating via a bus path that may include a memory bridge 1205. CPU 1202 includes one or more processing cores, and, in operation, CPU 1202 is the master processor of system 1200, controlling and coordinating operations of other system components. System memory 1204 stores software applications and data for use by CPU 1202. CPU 1202 runs software applications and optionally an operating system. Memory bridge 1205, which may be, e.g., a Northbridge chip, is connected via a bus or other communication path (e.g., a HyperTransport link) to an I/O (input/output) bridge 1207. I/O bridge 1207, which may be, e.g., a Southbridge chip, receives user input from one or more user input devices 1208 (e.g., keyboard, mouse, joystick, digitizer tablets, touch pads, touch screens, still or video cameras, motion sensors, and/or microphones) and forwards the input to CPU 1202 via memory bridge 1205.

A display processor 1212 is coupled to memory bridge 1205 via a bus or other communication path (e.g., a PCI Express, Accelerated Graphics Port, or HyperTransport link); in one embodiment display processor 1212 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 1204.

Display processor 1212 periodically delivers pixels to a display device 1210 (e.g., a screen or conventional CRT, plasma, OLED, SED or LCD based monitor or television). Additionally, display processor 1212 may output pixels to film recorders adapted to reproduce computer generated images on photographic film. Display processor 1212 can provide display device 1210 with an analog or digital signal.

A system disk 1214 is also connected to I/O bridge 1207 and may be configured to store content and applications and data for use by CPU 1202 and display processor 1212. System disk 1214 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 1216 provides connections between I/O bridge 1207 and other components such as a network adapter 1218 and various add-in cards 1220 and 1221. Network adapter 1218 allows system 1200 to communicate with other systems via an electronic communications network, and may include wired or wireless communication over local area networks and wide area networks such as the Internet.

Other components (not shown), including USB or other port connections, film recording devices, and the like, may also be connected to I/O bridge 1207. For example, an audio processor may be used to generate analog or digital audio output from instructions and/or data provided by CPU 1202, system memory 1204, or system disk 1214. Communication paths interconnecting the various components in FIG. 12 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 1212 incorporates circuitry optimized for graphics and video processing, including, for example, video output circuitry, and constitutes a graphics processing unit (GPU). In another embodiment, display processor 1212 incorporates circuitry optimized for general purpose processing. In yet another embodiment, display processor 1212 may be integrated with one or more other system elements, such as the memory bridge 1205, CPU 1202, and I/O bridge 1207 to form a system on chip (SoC). In still further embodiments, display processor 1212 is omitted and software executed by CPU 1202 performs the functions of display processor 1212.

Pixel data can be provided to display processor 1212 directly from CPU 1202. In some embodiments of the present invention, instructions and/or data representing a scene are provided to a render farm or a set of server computers, each similar to system 1200, via network adapter 1218 or system disk 1214. The render farm generates one or more rendered images of the scene using the provided instructions and/or data. These rendered images may be stored on computer-readable media in a digital format and optionally returned to system 1200 for display. Similarly, stereo image pairs processed by display processor 1212 may be output to other systems for display, stored in system disk 1214, or stored on computer-readable media in a digital format.

Alternatively, CPU 1202 provides display processor 1212 with data and/or instructions defining the desired output images, from which display processor 1212 generates the pixel data of one or more output images, including characterizing and/or adjusting the offset between stereo image pairs. The data and/or instructions defining the desired output images can be stored in system memory 1204 or graphics memory within display processor 1212. In an embodiment, display processor 1212 includes 3D rendering capabilities for generating pixel data for output images from instructions and data defining the geometry, lighting shading, texturing, motion, and/or camera parameters for a scene. Display processor 1212 can further include one or more programmable execution units capable of executing shader programs, tone mapping programs, and the like.

CPU 1202, render farm, and/or display processor 1212 can employ any surface or volume rendering technique known in the art to create one or more rendered images from the provided data and instructions, including rasterization, scanline rendering REYES or micropolygon rendering, ray casting, ray tracing, image-based rendering techniques, and/or combinations of these and any other rendering or image processing techniques known in the art.

It will be appreciated that the system shown herein is illustrative and that variations and modifications are possible. The connection topology, including the number and arrangement of bridges, may be modified as desired. For instance, in some embodiments, system memory 1204 is connected to CPU 1202 directly rather than through a bridge, and other devices communicate with system memory 1204 via memory bridge 1205 and CPU 1202. In other alternative topologies display processor 1212 is connected to I/O bridge 1207 or directly to CPU 1202, rather than to memory bridge 1205. In still other embodiments, I/O bridge 1207 and memory bridge 1205 might be integrated into a single chip. The particular components shown herein are optional; for instance, any number of add-in cards or peripheral devices might be supported. In some embodiments, switch 1216 is eliminated, and network adapter 1218 and add-in cards 1220, 1221 connect directly to I/O bridge 1207.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for generating a circular scratch highlight, the method comprising:
    accessing a plurality of texture planes, wherein each texture plane includes a plurality of copies of a texture oriented in the same direction;
    accessing a combined texture by combining the plurality of texture planes at different angles;
    applying the combined texture to a surface of an object;
    calculating a specular gradient vector based on a light vector, a normal vector, and a view vector, wherein the specular gradient vector points in a gradient direction of a specular highlight; and
    generating, via a processor, the circular scratch highlight by assigning, for each of a plurality of points on the surface of the object, a separate weight value corresponding to each texture plane in the combined texture based on how closely an orientation of the texture plane at the point corresponds to a scratch vector that is perpendicular to the specular gradient vector.

2. The method of claim 1, wherein the texture comprises a scratch texture that includes a plurality of scratch elements.

3. The method of claim 2, wherein the scratch elements are oriented in the same direction relative to one another with the scratch texture.

4. The method of claim 1, wherein the specular gradient vector is calculated based on a Phong specular model or a Blinn specular model.

5. The method of claim 1, wherein generating the circular scratch highlight further comprises assigning an intensity value at the point on the surface of the object based on an angle between the specular gradient vector and the scratch vector.

6. The method of claim 5, further comprising:
    defining a polar coordinate space around the center of the specular highlight; and
    scaling the intensity value based on a location of the point in the polar coordinate space and a field defined over the polar coordinate space.

7. The method of claim 6, wherein the field comprises a star or flower shape.

8. The method of claim 6, wherein the field is a random field.

9. The method of claim 1, wherein, for a first point, the light vector represents a direction of light from a light source to the first point, the normal vector represents a direction perpendicular to a surface at the first point, and the view vector represents a direction from a viewer or camera to the first point.

10. A non-transitory computer-readable medium storing instructions that, when executed by a processor, cause a computer system to generate a circular scratch highlight, by performing the steps of:
- accessing a plurality of texture planes, wherein each texture plane includes a plurality of copies of a texture oriented in the same direction;
- accessing a combined texture by combining the plurality of texture planes at different angles;
- applying the combined texture to a surface of an object;
- calculating a specular gradient vector based on a light vector, a normal vector, and a view vector, wherein the specular gradient vector points in a gradient direction of a specular highlight; and
- generating the circular scratch highlight by assigning, for each of a plurality of points on the surface of the object, a separate weight value corresponding to each texture plane in the combined texture based on how closely an orientation of the texture plane at the point corresponds to a scratch vector that is perpendicular to the specular gradient vector.

11. The computer-readable medium of claim 10, wherein the texture comprises a scratch texture that includes a plurality of scratch elements.

12. The computer-readable medium of claim 11, wherein the scratch elements are oriented in the same direction relative to one another with the scratch texture.

13. The computer-readable medium of claim 10, wherein the specular gradient vector is calculated based on a Phong specular model or a Blinn specular model.

14. The computer-readable medium of claim 10, wherein generating the circular scratch highlight further comprises assigning an intensity value at the point on the surface of the object based on an angle between the specular gradient vector and the scratch vector.

15. The computer-readable medium of claim 14, further comprising:
- defining a polar coordinate space around the center of the specular highlight; and
- scaling the intensity value based on a location of the point in the polar coordinate space and a field defined over the polar coordinate space.

16. The computer-readable medium of claim 15, wherein the field comprises a star or flower shape.

17. The computer-readable medium of claim 15, wherein the field is a random field.

18. The computer-readable medium of claim 10, wherein, for a first point, the light vector represents a direction of light from a light source to the first point, the normal vector represents a direction perpendicular to a surface at the first point, and the view vector represents a direction from a viewer or camera to the first point.

* * * * *